United States Patent
Gerum

(10) Patent No.: US 8,337,169 B2
(45) Date of Patent: Dec. 25, 2012

(54) SYSTEM WITH A COMPRESSOR AND WITH A CONSUMER IN A MOTOR VEHICLE

(75) Inventor: Eduard Gerum, Rosenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 773 days.

(21) Appl. No.: 12/355,575

(22) Filed: Jan. 16, 2009

(65) Prior Publication Data

US 2009/0120405 A1    May 14, 2009

Related U.S. Application Data

(63) Continuation of application No. PCT/EP2007/006421, filed on Jul. 19, 2007.

(30) Foreign Application Priority Data

Jul. 19, 2006 (DE) .................. 10 2006 033 428

(51) Int. Cl.
F04B 23/08    (2006.01)
F02B 67/04    (2006.01)

(52) U.S. Cl. ............... 417/199.1; 123/198 C; 418/16

(58) Field of Classification Search .......... 417/201, 417/380, 286, 287, 426, 429, 199.1; 123/198 C; 60/486; 418/16
See application file for complete search history.

(56) References Cited

U.S. PATENT DOCUMENTS

| | | | | |
|---|---|---|---|---|
| 1,341,915 A | * | 6/1920 | Ladd et al. | 417/364 |
| 2,655,110 A | * | 10/1953 | Sanborn | 417/199.1 |
| 3,037,455 A | * | 6/1962 | Bozimowski et al. | 418/3 |
| 4,460,056 A | * | 7/1984 | Jaccod | 180/53.7 |
| 5,195,479 A | | 3/1993 | Hasetoh et al. | |
| 5,833,445 A | | 11/1998 | Van Spijk | |
| 5,918,573 A | * | 7/1999 | Killion | 123/192.2 |
| 5,983,780 A | | 11/1999 | Nakamoto et al. | |
| 6,289,878 B1 | * | 9/2001 | Blass | 123/509 |
| 7,066,126 B2 | * | 6/2006 | Tokuyasu et al. | 123/179.17 |
| 7,428,944 B2 | * | 9/2008 | Gerum | 180/422 |
| 7,588,432 B2 | * | 9/2009 | Takagi et al. | 418/255 |
| 2006/0280636 A1 | | 12/2006 | Bachmann et al. | |

FOREIGN PATENT DOCUMENTS

DE    696 29 543 T2    4/2004
(Continued)

OTHER PUBLICATIONS

International Search Report dated Nov. 22, 2007 with English translation (Six (6) pages).

(Continued)

*Primary Examiner* — Charles Freay
*Assistant Examiner* — Nathan Zollinger
(74) *Attorney, Agent, or Firm* — Crowell & Moring LLP

(57) ABSTRACT

A system has a compressor and a consumer which are coupled to a drivetrain and extract energy through the drivetrain. The consumer is suitable for varying an absorption of power, which is made available to it by the drivetrain, as a function of a power which is required for compressor operation and which is supplied from the drivetrain to the compressor. A pump has at least one pump chamber which generates a pumping power during pumping operation. The pump additionally has at least one pump chamber which generates no pumping power or a reduced pumping power during pumping operation.

7 Claims, 2 Drawing Sheets

FOREIGN PATENT DOCUMENTS

| | | | |
|---|---|---|---|
| DE | 10 2005 013 027 | A1 | 10/2006 |
| EP | 0 052 527 | B1 | 5/1982 |
| EP | 1 103 741 | A2 | 5/2001 |
| EP | 1 342 920 | A2 | 9/2003 |
| JP | 1-160180 | U | 11/1989 |
| JP | 2000-45814 | A | 2/2000 |
| WO | WO 96/09464 | A1 | 3/1996 |
| WO | WO 2005/042976 | A1 | 5/2005 |

OTHER PUBLICATIONS

German Office Action dated Mar. 12, 2009 including English translation (Ten (10) pages).

* cited by examiner

SYSTEM WITH A COMPRESSOR AND WITH A CONSUMER IN A MOTOR VEHICLE

CROSS-REFERENCE TO RELATED APPLICATIONS

This application is a continuation of PCT International Application No. PCT/EP2007/006421, filed Jul. 19, 2007, which claims priority under 35 U.S.C. §119 to German Patent Application No. DE 10 2006 033 428.0, filed Jul. 19, 2006, the entire disclosures of which are herein expressly incorporated by reference.

BACKGROUND AND SUMMARY OF THE INVENTION

The invention relates to a system comprising a compressor and a consumer, which are coupled to a drive train and extract energy therefrom. The invention further relates to a pump, which has at least one pump chamber which generates pumping power during a pumping operation.

In motor vehicles, systems comprising compressors are frequently used. Thus compressors are used, for example, for supplying compressed air for brakes, pneumatic suspension, gear units, etc. Generally, the compressor is driven by an internal combustion engine of the motor vehicle via a drive train, which may be disconnected by means of a clutch device for relieving the internal combustion engine, if the boundary conditions permit this.

Moreover, modern motor vehicles are generally provided with power-assisted steering, also known as a servo-assisted steering, which substantially consists of a power steering pump or hydraulic pump, such as for example an oil pump, and a hydraulic circuit, via which the hydraulic pump supplies a hydraulic pressure to the power-assisted steering coupled to a steering linkage. As a result, an auxiliary force is produced which is applied by means of a suitable mechanical means to the steering wheel in an assisting manner. The hydraulic pump is frequently driven indirectly, i.e. indirectly by the drive train of the internal combustion engine. For example, the compressor is arranged in the drive train between the internal combustion engine and the hydraulic pump, the compressor in turn driving the hydraulic pump as a consumer.

Generally, compressors exhibit an uneven characteristic of the drive torque required for compressor operation and/or of the driving power required for compressor operation, the drive torque and/or the driving power being provided by the internal combustion engine. For example, when the compressor performs a compression cycle and/or a compression stroke, the drive torque required for compressor operation is particularly high in comparison with an expansion cycle and/or expansion stroke. This may be observed primarily with piston compressors having at least one cylinder. The drive torque required in the compression cycle for compressor operation, and/or the driving power required therefor, increases with the progression of the piston in the direction of the top dead center in the cylinder and, in a region in the vicinity of the top dead center, finally reaches a peak value, hereinafter denoted the torque peak or power peak. As a result of the torque peak, retrospective effects are produced on the internal combustion engine, for example on the gear train of the internal combustion engine.

Similarly, disruptions to the precise running of the cam shaft may be caused. Thus a constant and/or uniform characteristic is desired of the torque and/or power which the internal combustion engine produces.

Moreover, an increased drive torque and/or an increased driving power of the internal combustion engine is required when, in addition to the compressor, a power steering pump or hydraulic pump has to be driven which is located in the same drive train of the compressor. Similarly, the clutch device provided in the drive train of the internal combustion engine has to be designed according to the maximum transmitted drive torque and/or the maximum supplied driving power of the internal combustion engine.

It is, therefore, the object of the present invention to improve the generic system further with regard to the loading of the components arranged in the drive train.

The system according to the invention has a compressor and a consumer, which are coupled to a drive train and extract energy therefrom. The consumer is suitable for varying an absorption of a power provided thereto by the drive train depending on a power which is required for compressor operation and supplied from the drive train to the compressor. The dependence of the power absorption of the consumer on the power required for compressor operation, which is supplied to the compressor, is advantageous insofar that a power provided in the drive train, such as for example a time characteristic of a total power, may be positively influenced by suitable variation of the power absorption of the consumer.

Advantageous embodiments and developments of the invention are described herein.

In a preferred embodiment of the system according to the invention, it is provided that the consumer is suitable for varying its absorption of the power provided thereto, such that a characteristic of the total power consisting of the power required for compressor operation and the power absorbed by the consumer is substantially constant. This development is particularly advantageous as the compressor during compressor operation, in principle, has a very uneven characteristic of the driving power required for compressor operation and/or of the drive torque required for compressor operation. By corresponding variation of the power absorption of the consumer, said uneven characteristic is compensated as a whole. This is based, therefore, on the fact that the total torque provided in the drive train and/or the total power provided in the drive train is a superposition of the drive torque and/or driving power required for compressor operation and the torque and/or power absorbed by the consumer. Thus possible retrospective effects due to torque fluctuations or torque peaks on the drive train, which for example is branched off from an internal combustion engine, are avoided.

Moreover, the system according to the invention may be developed by the consumer being suitable for reducing its absorption of the power provided thereto, when a characteristic of the power required for compressor operation rises above a predetermined threshold value, or reaches a maximum power range. By setting the threshold value, it is prevented that the total torque characteristic and/or the total power characteristic in the drive train exceeds a maximum permissible value, at the same time a power peak and/or a torque peak in the drive train being avoided. The level of the threshold value is thus established such that, advantageously, retrospective effects on the drive train, for example on an internal combustion engine located in the drive train, are substantially prevented.

Moreover, the system according to the invention may be developed such that the power required for compressor operation in a compression cycle or a compression stroke exceeds the threshold value or reaches its maximum power. In particular, during a compression cycle, a very high torque and/or a very high driving power may be required for driving the compressor. The high drive torque which reaches a very high torque peak shortly before reaching the top dead center, in piston compressors, may be compensated as mentioned above. Thus, it is particularly advantageous to reduce the power absorption of the consumer precisely when the compressor performs its compression cycle, in particular shortly before reaching the top dead center, in order to ensure a uniform total power characteristic and/or total torque characteristic in the drive train.

The system according to the invention may furthermore be designed such that the consumer includes a pump, in particular a power steering pump or a hydraulic pump, which is suitable for carrying out an operation providing a pumping power, in which the power provided is absorbed, and an operation producing no pumping power or reduced pumping power depending on the operating conditions of the compressor, in which no absorption or reduced absorption of the power provided takes place. By means of this development, the pump located in the drive train, which generally has a uniform torque characteristic and/or power characteristic, is adapted to the characteristic of the power required and supplied for compressor operation, in order to achieve the above-mentioned constant characteristic of the total power.

In a preferred embodiment, the system according to the invention is designed such that the pump is a displacement pump, in particular a vane pump or a piston pump, in which at least one pump chamber is formed, providing no pumping power or reduced pumping power depending on the operating conditions of the compressor, by which in a pumping operation no absorption or reduced absorption of the power provided takes place, the pump further including at least one pump chamber providing a pumping power, by which in a pumping operation the power provided is absorbed. By this design of the pump, it is possible that by structural measures on the pump chambers the abovementioned variable operations may be performed. Thus the vane pump may have more than 6 pump chambers, of which one portion of the chambers is able to be transferred into a "non pumping" state, in order to reduce the power absorption during operation of this pump chamber and thus to achieve the above-mentioned compensation of the peak torque. This may, for example take place by an enlarged chamber volume in a vane pump, which for example in the case of the vane pump may be increased by redesigning the rotor, i.e. using a rotor which is flattened on one side relative to the rotor longitudinal axis, which on the flattened side partially forms the pump chamber providing no pumping power. Similarly, however, a design of a pump chamber providing a reduced pumping power is also contemplated, the pumping power capacity thereof being made dependent on various factors. Moreover, other measures are also contemplated which prevent an operation of the corresponding chamber(s) producing pumping power. Thus, for example, with piston pumps having a plurality of cylinders, in particular with a swash plate piston pump, the elimination of one or more pistons may prevent any pumping power for this corresponding chamber.

The system according to the invention may, moreover, be developed such that the compressor is driven by a drive train of an internal combustion engine and the consumer is driven by a drive train of the compressor, optionally a clutch device being arranged in the drive train of the internal combustion engine. This development proves particularly advantageous, as the internal combustion engine provides the compressor with a constant characteristic of the drive torque and/or a constant characteristic of the driving power, without an increase in the drive torque occurring as a result of the compressor cycle, whereby problems in the gear train of the engine and disruptions to the precise running of the cam shaft due to the compensation of the torque peak may be avoided. Similarly, the system according to the invention permits, with the use of a clutch device such as an idling clutch, the reduction in size thereof and thus the lowering of the costs arising therefrom, as the clutch device is designed for the maximum drive torque of the compressor and/or the torque peak. It is noteworthy that the arrangement mentioned here corresponds to an arrangement of the engine, compressor and consumer in series. However, equally a parallel arrangement of the compressor and consumer or other arrangements are contemplated provided the compressor and consumer are coupled to the same drive train.

The pump according to the invention is based on the prior art such that it further includes at least one pump chamber, which during the pumping operation provides no pumping power or a reduced pumping power. Generally, the advantages cited in connection with the power steering pump and/or hydraulic pump apply thereto.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
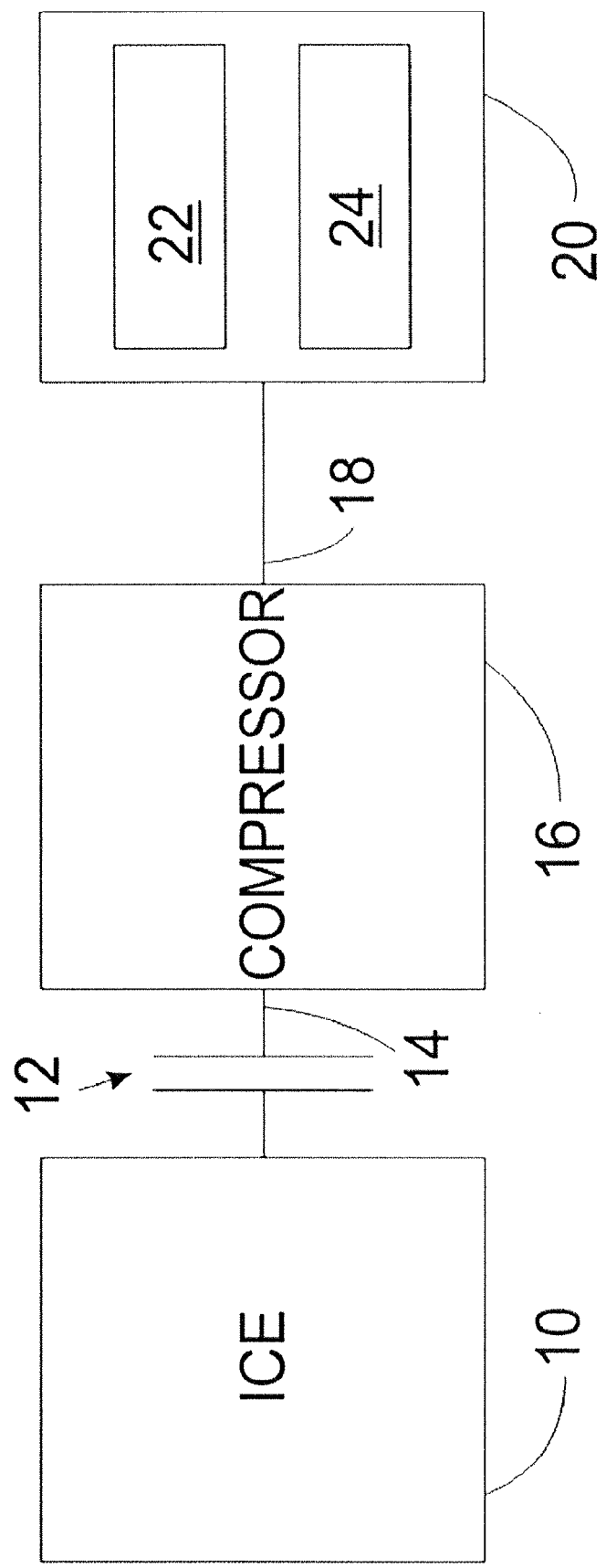
FIG. 1 shows a schematic representation of the system according to the invention.

FIG. 1 shows a schematic representation of the system according to the invention. An internal combustion engine 10 of a motor vehicle is coupled to a compressor 16 via a drive train 14. The compressor 16 is, for example, provided for supplying compressed air to various components in the motor vehicle, not mentioned in more detail.

An idler clutch and/or a clutch device 12 is arranged in the drive train 14 between the internal combustion engine 10 and the compressor 16. The clutch device 12 is used for coupling the compressor 16 to the internal combustion engine 10 and for uncoupling the compressor therefrom. For example, the compressor 16 is uncoupled from the drive train 14 of the internal combustion engine 10, when an operation of the compressor 16 is no longer required and the vehicle conditions and/or boundary conditions permit this.

In particular embodiments, the compressor 16 may be a reciprocating compressor having one or more cylinders; however other designs are also possible.

Moreover, the compressor 16 is coupled to a consumer 20 via a drive train 18. The consumer 20 is in this embodiment a power steering pump or a hydraulic pump, which is assigned to a servo-assisted steering unit and/or power-assisted steering unit. In particular, the hydraulic pump may be a displacement pump, such as for example a vane pump or a piston pump. The hydraulic pump has two pump chambers 22 and 24 shown schematically in FIG. 1. The pump chamber 24 is a pump chamber providing a pumping power by which a fluid is delivered in a hydraulic circuit (not shown) of the power assisted steering unit. Provided this pump chamber 24 is in operation, the pump receives a driving power from the compressor 16 via the drive train 18. The pump chamber 22, however, is designed in this embodiment such that it does not provide any pumping power. Provided this pump chamber 22 is in operation, the pump does not receive any driving power from the compressor 16 via the drive train 18.

Alternatively, the pumping power of this pump chamber 22 may also be reduced and does not have to be set to almost zero. The extent of the reduction of the pumping power may be established, for example, depending on the compressor 16 used, which is located in the drive train of the internal combustion engine 10, or even other components arranged there. Thus the extent of the reduction of the pumping power of the pump chamber 22 depends on various factors, such as for example the operating conditions (torque characteristic, etc.) of the compressor 16 and/or of the other components.

In FIG. 1 only two different pump chambers are shown, but a plurality of different pump chambers of the aforementioned type may be provided.

The arrangement shown in FIG. 1 of the compressor 16 and the consumer 20 is not imperative. It is essential that the compressor 16 and the consumer are coupled to the same drive train. Thus, the consumer may be directly coupled to the drive train 14 of the internal combustion engine 10, instead of being coupled to the drive train 18.

During operation, the internal combustion engine 10 drives the compressor 16 via the drive train 14. In this case, the clutch device 12 is engaged, so that the drive torque of the internal combustion engine 10 is transmitted to the compressor 16 and/or the driving power of the internal combustion engine 10 is provided to the compressor. Thus the internal combustion engine 10 delivers a driving power which is required both for the operation of the compressor 16 and also for the operation of the consumer 20, as the consumer 20, as shown in FIG. 1, is coupled to the compressor 16.

For lowering the power consumption of the internal combustion engine 10, the clutch device 12 may also be uncoupled if the operating conditions of the motor vehicle and/or the boundary conditions permit this and the compressor does not have to be driven. Hereinafter, however, details are provided of a clutch device 12 in engagement and thus transmitting drive torque.

During operation, the compressor 16 performs an expansion cycle and a compression cycle. In the case of a reciprocating compressor, the reciprocating compressor carries out, for example, a lifting motion of a piston (not shown), by which for example compressed air is provided for a compressed air system, which is not explained in more detail. During the compression cycle, i.e. while the piston advances from a bottom dead center in the direction of a top dead center, the characteristic of the torque/power required for compressor operation is present in the drive train 14, as is explained hereinafter. For simplifying the explanation, detail is provided hereinafter of a reciprocating compressor having only one piston/cylinder.

If the piston of the compressor 16 moves from the bottom dead center in the direction of the top dead center, the fluid located in a cylinder is compressed. The pressure in the cylinder thus increases. With the pressure increase in the cylinder the torque supplied to the compressor 16 and required for compressor operation, which is supplied by the internal combustion engine 10, also increases. From a specific piston stroke, i.e. during a specific stroke path covered during the compression cycle, the pressure in the cylinder begins to increase more strongly. This leads to a torque peak in the characteristic of the torque required for compressor operation. In order to compensate for this torque peak of the characteristic of the torque in the drive train 14 required for compressor operation, according to the invention the consumer 20 is provided on the drive train 18 of the compressor 16, such that it reduces its power absorption, in the same manner that the characteristic of the torque required for compressor operation in the compression cycle exceeds a threshold value or reaches a peak torque.

As a result, overall, the engine drive torque in the drive train 14, which represents a superposition of the torque required for the compression operation and the torque of the consumer 20, is maintained substantially constant and/or the abovementioned power and/or torque peak is compensated due to the reduced power absorption of the consumer. As a result, an almost uniform and/or constant characteristic of the torque transmitted from the internal combustion engine 10 and/or of the driving power output from the internal combustion engine 10 is provided.

In order to reduce the power absorption of the consumer 20 in the compression stroke of the compressor 16, the consumer 20, which in the particular embodiment is the power steering pump or hydraulic pump, during the compression cycle and after exceeding the threshold value thus operates the particular pump chamber which provides no pumping power, whereby the power absorption of the hydraulic pump is reduced. As a result, the characteristic of the torque and/or the driving power of the internal combustion engine 10 is kept constant and/or the torque peak is compensated. If the compressor 16 is no longer in the compression cycle, but for example in the expansion cycle, in which the characteristic of the power required for compressor operation falls below the predetermined threshold value and/or does not pass through peak power, the pump operates the pump chamber 22, which provides a pumping power and accordingly delivers the fluid, whereby the power absorption of the consumer 20 is increased.

Figure 2:
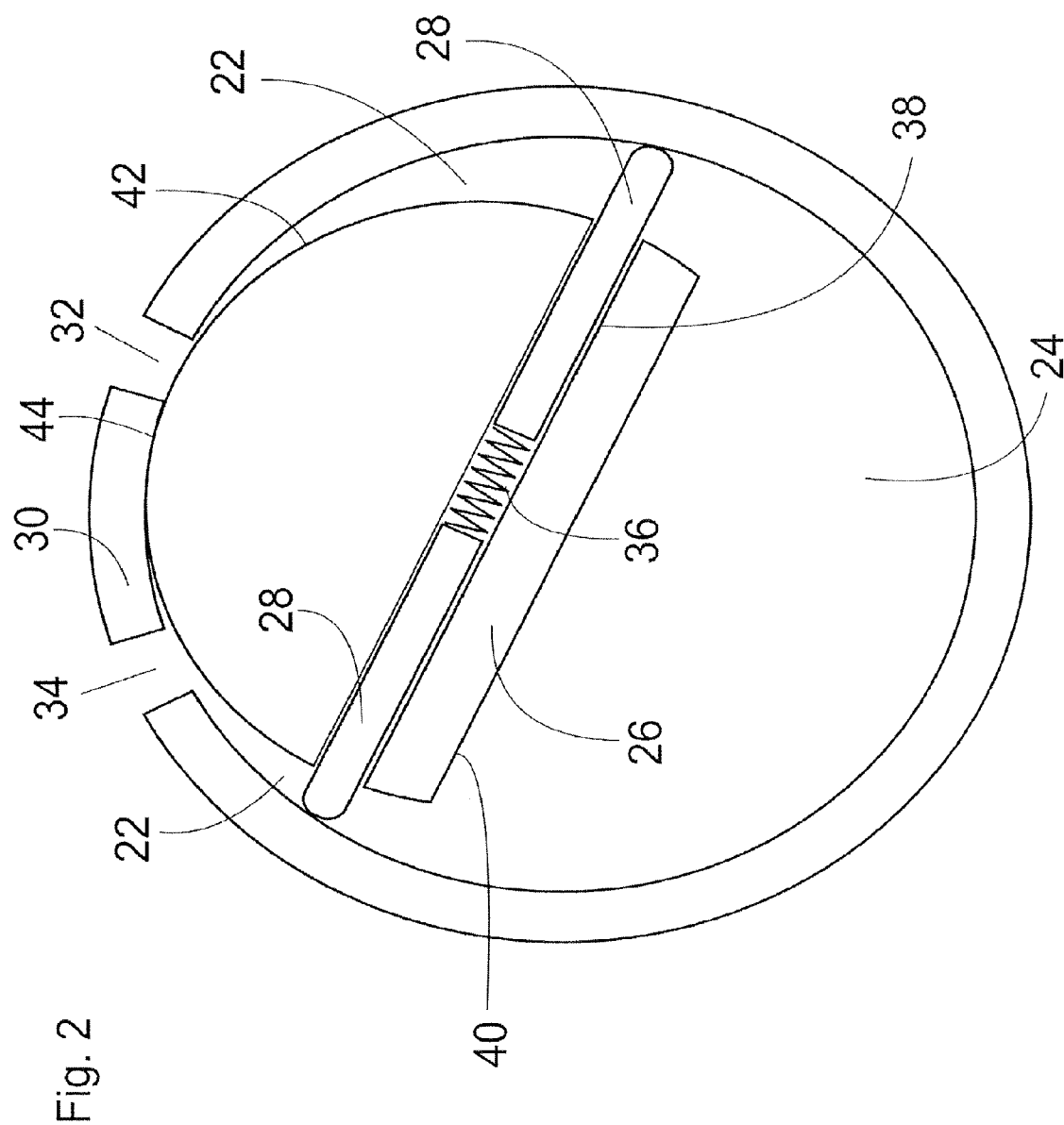
FIG. 2 shows a particular embodiment of the consumer according to FIG. 1.

FIG. 2 shows a particular embodiment of the consumer 20 according to FIG. 1. In FIG. 2, the hydraulic pump or power steering pump forming the consumer 20 is a vane pump according to the invention and shown in a radial section, which is modified such that it may execute the abovementioned variable operations, i.e. an operation providing pumping power and an operation providing no pumping power. In FIG. 2, the vane pump is shown with 3 pump chambers, but modified vane pumps having merely 2 pump chambers or more than 3 pump chambers of the aforementioned type may also be used.

The vane pump has a rotor 26 and a stator 30. The rotor 26 is of substantially cylindrical configuration and rotatably mounted about its longitudinal axis in the stator 30. On a first side 40, the rotor 26 is flattened, i.e. on the first side 40 viewed in the axial direction and/or in the direction of the rotational axis, a circular portion and/or circular segment is removed from the rotor 26, the rotor 26 forming on this side a flattened portion. Moreover, the rotor 26 is in contact with the stator 30 by way of a contact portion 44, which is located on a second side 42 of the rotor 26, which is remote from the side 40 of the rotor 26.

In the rotor 26 a guide 38 is formed which extends perpendicular to the rotational axis thereof and runs through the rotor 26. Preferably, the guide 38 extends through the rotational axis, so that the first side 40 relative to the guide 38 has the flattened portion of the rotor 26 and the second side 42 relative to the guide 38 has the contact portion 44 of the rotor 26. In the guide 38, two rotary slide valves 28 are arranged, which are held by way of a spring 36 and pretensioned against the stator 30. The spring is rigidly fixed in the rotor 26. Thus, the rotor 26 forms together with the stator 30, the contact portion 44 of the stator 30 and the rotor 26, and the rotary slide valves 28 different pump chambers 22 and 24.

In the stator, a discharge opening 32 and an intake opening 34 are located, which respectively discharge and draw in a fluid. As is visible from FIG. 2, the space inside the stator 30 is subdivided by the rotor 26, in particular the contact portion 44 of the rotor 26 with the stator 30, and the rotary slide valves into different pump chambers 22 and 24. The pump chamber 24 is thus a pump chamber providing no pumping power, whereas the pump chambers 22 are pump chambers providing a pumping power. This is effected by the enlarged chamber space due to the removal of material and/or flattening and/or the flattened portion of the rotor 26.

During operation, the rotor 26 is rotated about its rotational axis, for example in the right-hand direction, i.e. counter-clockwise. As the rotary slide valves 28 are continuously in contact with the stator 30 due to the pretensioning of the spring 36 and seal a gap located therebetween, the fluid located in the pump chamber 22 is delivered to the discharge opening 32. Moreover, the other pump chamber 22 draws in the fluid via the intake opening 34 due to the rotary motion of the rotor 26. The pump chamber 24, however, is formed by the particular design of the rotor 26 such that it is not able to provide any pumping power. This is based on the fact, therefore, that the rotor 26 in an appropriate position, i.e., in the position in which the flattened portion of the rotor 26 faces the discharge opening 32 and the intake opening 34, is not able to form any contact with the stator 30 between the discharge opening 32 and the intake opening 34, i.e. the rotor 26 does not have a contact portion 44 on the side forming the pump chamber 24. As a result, the discharge opening 32 and the intake opening 34 in the pump chamber 24 are permanently connected in an appropriate position of the rotor 26, whereby no fluid is delivered and accordingly also no pumping power is provided. Accordingly, the power absorption of the pump is considerably reduced.

According to the invention, therefore, the operation of this pump chamber 24 is made to coincide chronologically and/or synchronized with the compression cycle of the compressor 16 after exceeding the aforementioned threshold value. Thus, the pump provides no pumping power, when the characteristic of the driving power required for compressor operation has exceeded the threshold value. Thus, the uniform torque characteristic of the vane pump is markedly reduced at a specific crankshaft angle of the rotor 26. Thus, the reduction takes place at the point of maximum torque transmitted to the compressor 16, a uniform total torque characteristic and/or a uniform total driving power characteristic being ensured and/or maintained constant in the drive train 14 of the internal combustion engine 10, as explained above.

Table of Reference Numerals

10 Internal combustion engine
12 Clutch device
14 Drive train
16 Compressor
18 Drive train
20 Consumer
22 Pump chamber
24 Pump chamber
26 Rotor
28 Rotary slide valve
30 Stator
32 Discharge opening
34 Intake opening
36 Spring
38 Guide -continued Table of Reference Numerals 40 First side of the rotor
42 Second side of the rotor
44 Contact portion of the rotor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system, comprising:
a drive train;
a compressor and a consumer coupled to the drive train and extracting energy therefrom;
wherein the compressor executes a compression stroke and an expansion stroke during operation;
wherein the consumer comprises a pump that is a displacement pump comprising at least one pump chamber providing pumping power absorbed by the consumer and at least one further pump chamber that provides a reduced or no pumping power depending on the operating conditions of the compressor;
wherein the pump further comprises
a stator in which is formed a discharge opening and an intake opening;
a rotor arranged inside the stator, the rotor having a generally cylindrical shape with a flattened portion;
wherein the rotor and stator form the at least one pump chamber and the at least one further pump chamber;
wherein, when the flattened portion of the rotor faces the discharge opening and the intake opening formed in the stator, no contact occurs between the rotor and the stator;
wherein the pump varies an absorption of power provided thereto by the drive train depending on the power required for operation of the compressor and supplied from the drive train to the compressor; and
whereby a characteristic of a total power including the power required for operation of the compressor and power absorbed by the consumer is substantially constant during a compression stroke of the compressor.

2. The system according to claim 1, wherein the consumer is operatively configured to reduce the absorption of power provided thereto, when a characteristic of the power required for operation of the compressor rises above a predetermined threshold value or reaches a maximum power range.

3. The system according to claim 2, wherein the power required for operation of the compressor in a compression cycle or the compression stroke exceeds the predetermined threshold value or reaches the maximum power range.

4. The system according to claim 1, wherein the pump is one of a power steering pump and a hydraulic pump.

5. The system according to claim 1, wherein the pump is a vane pump.

6. The system according to claim 1, wherein the drive train includes a first drive train in which an internal combustion engine drives the compressor, and a second drive train by which the consumer is driven by the compressor.

7. The system according to claim 6, further comprising a clutch arranged in the first drive train of the internal combustion engine.

* * * * *